July 15, 1941.                J. L. ANDERSON                 2,249,592
                                TUBE WELDING
                             Filed July 10, 1937            2 Sheets-Sheet 1
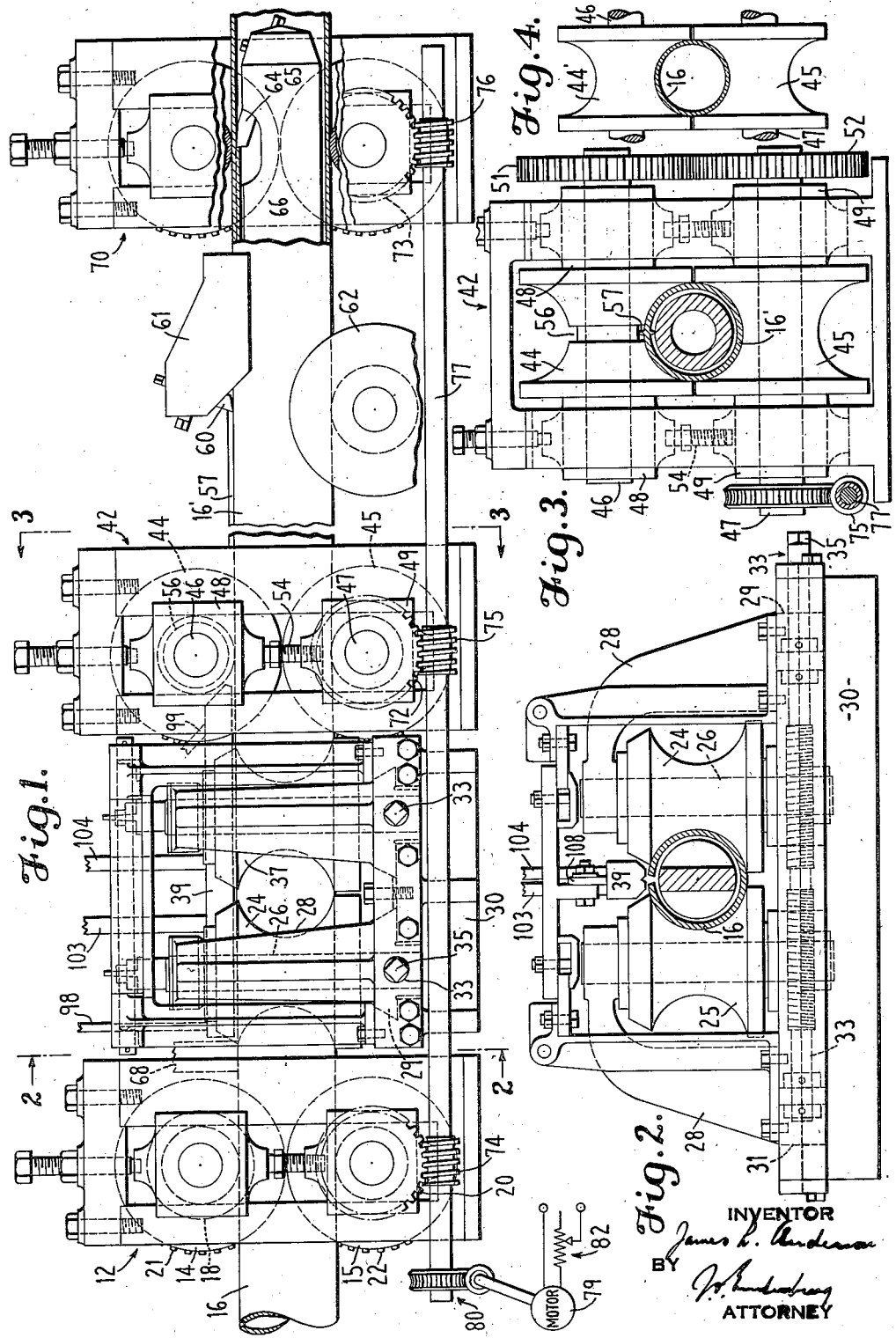
INVENTOR
James L. Anderson
BY
ATTORNEY

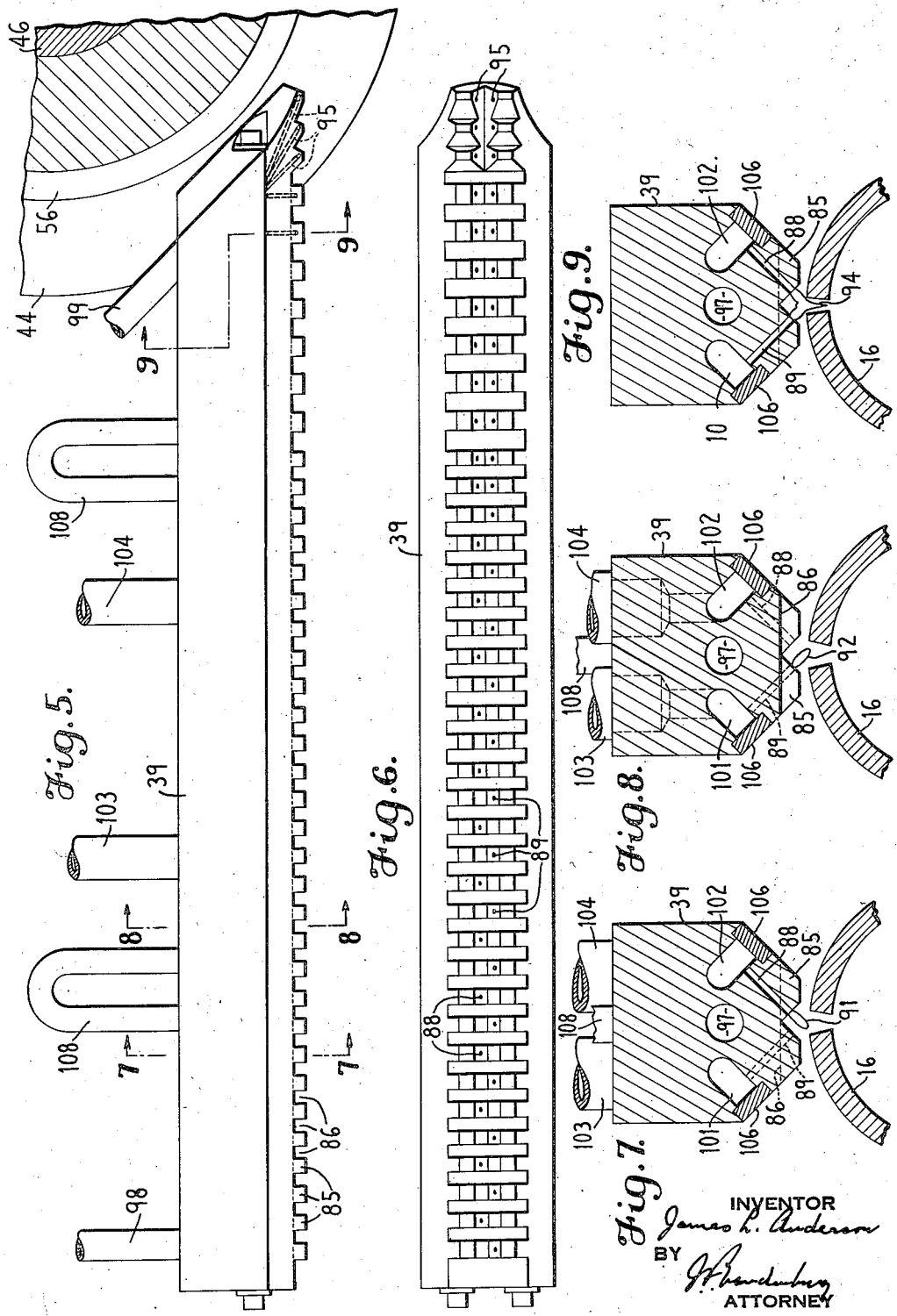

Patented July 15, 1941

2,249,592

UNITED STATES PATENT OFFICE 2,249,592

TUBE WELDING

James L. Anderson, Closter, N. J., assignor to Air Reduction Company, Incorporated, New York, N. Y., a corporation of New York Application July 10, 1937, Serial No. 152,957

2 Claims. (Cl. 113—112)

This invention relates to welding, more especially oxyacetylene welding, of the longitudinal seams of tubing.

In some oxyacetylene welded tubing made from hard-rolled stock there is a decrease in the hardness of the stock adjacent the weld. When high intensity oxyacetylene flames are projected directly against the edge faces of the stock, the welded seams are likely to be hardened. The reasons for these differences are that methods which melt away substantial quantities of the edges in making a weld store enough heat in the metal back of the weld to cause slow cooling and annealing of the metal along the seam; whereas direct flame heating does not heat the metal for any substantial distance back of the edge faces, and the conduction losses from the edge faces cause them to cool so rapidly that their hardness is increased.

In this invention there is a combination of direct flame heating of the edge faces with supplemental flame heating from above the seam as the seam edges come together. With this heating technique a better control of the heating is obtained and it is possible to weld hard rolled stock without producing any substantial change in the hardness of the metal adjacent the weld.

Other objects, features and advantages of the invention will appear or be pointed out as the specification proceeds.

In the accompanying drawings, forming part hereof:

Fig. 1 is a side elevation, partly diagrammatic, showing apparatus for making welded tubes in accordance with this invention.

Figs. 2 and 3 are sectional views on the lines 2—2 and 3—3, respectively, of Fig. 1.

Fig. 4 is a reduced fragmentary detail view showing alternative roll structure for the welding roll stand of Fig. 3.

Fig. 5 is an enlarged view of the torch shown in Fig. 1.

Fig. 6 is a bottom plan view of the torch.

Figs. 7-9 are enlarged sectional views taken on the lines 7—7 to 9—9, respectively, of Fig. 5, the upper portion of the tube being also shown to illustrate the relation of the seam edges and the flame jets.

A tube blank which may come direct from a forming mill, and which may be either cold or preheated, enters a roll stand 12 having feed rolls 14 and 15. The tube blank is indicated by the reference character 16 and the welded tube by the reference character 16'.

The upper feed roll 14 has a central fin 18 which extends into the seam and acts as a seam guide in a manner well understood in the art. The lower feed roll 15 is driven by a worm wheel 20 secured to the axle of the roll 15, and the upper feed roll 14 is driven through meshing gears 21 and 22 fastened to the upper and lower roll axles. These driving connections to the rolls are similar to those of the welding roll stand and will be described somewhat more fully in the explanation of the welding roll structure shown in Fig. 3.

Beyond the feed roll stand 12, the tube blank 16 passes between confining or gathering rolls 24, 25 (Fig. 2) which hold the tube blank with its edge faces in a definite spaced relation or bring the edges closer together deepnding upon the adjustment of the gathering rolls.

The roll 24 turns on a substantially vertical axle 26 carried by a frame 28. This frame has a gib base 29 (Fig. 1) which slides in ways on the main frame 30. The roll 25 is supported in a similar manner from a gib base 31 which slides in the same transverse ways, and the gibs are adjusted toward and from one another by a lead screw 33 having a right-hand thread in the gib base 29 and a left-hand thread in the gib base 31. One end of the lead screw 33 has a square section 35 to which a wrench or handle is applied to turn the screw and move the rolls 24 and 25 closer or further from one another to obtain the desired spacing of the tube seam edges.

A second set of confining or gathering rolls 37, similar to the rolls 24 and 25, and similarly adjustable, are located just beyond the rolls 24, 25.

During the time that the tube blank 16 is passing between the gathering rolls, the edge faces are heated locally. Various heating instrumentalities can be employed to raise the temperature of the edge faces. The drawing shows an oxy-fuel gas torch 39 that is particularly suitable for the purpose. The torch and the method of heating the edges to be welded will be described fully in connection with Figs. 5–9. At this point it is sufficient to understand that the confronting edge faces of the seam cleft are raised to a welding condition during their passage under the torch 39.

Immediately beyond the torch 39, the tube blank 16 passes through a welding roll stand 42 having welding rolls 44 and 45 keyed to axles 46 and 47, respectively. These axles turn in bearing blocks 48 and 49 which are vertically movable in guideways on opposite sides of the frame of the welding roll stand. The upper axle 46 is driven from the lower axle 47 through meshing gears 51 and 52 secured to the axles.

The bearing blocks 48 and 49 are held in spaced relation by means of adjusting screws 54. These screws are rotated to move the axles 46 and 47 together or apart to change the pressure which the welding rolls exert on the seam edges when pressing them together. The upper welding roll 44 in Fig. 3 has a central groove 56 into which a flash 57 or reinforcement can extend when the welding rolls are adjusted to exert sufficient pressure to squeeze some or all of the molten metal from between the edge portions when they are pressed together to make the weld. A flash may also be squeezed out inside of the tube as shown in Fig. 3.

With the intensity of the heating agencies so correlated with the speed of travel of the tube blank that there is only a superficial melting of the edge faces of the seam cleft, or when making welded tubes where some cast metal in the weld will not be objectionable, the welding rolls are adjusted so that they bring the edge faces of the seam cleft into contact but do not exert any substantial pressure on them. In such a case it is not necessary to have any groove in the face of the upper welding roll.

Fig. 4 shows an upper welding roll 44' which has no groove in its face. Even with smooth welding rolls such as shown in Fig. 4 it is possible to squeeze out an inside flash if it becomes desirable to do so. Except for the lack of a central groove, the rolls shown in Fig. 4 are the same as those of Fig. 3 though shown on a smaller scale.

When the welding rolls are adjusted so as to produce the flash 57, that squeezed-out metal is preferably removed an a continuous operation with the welding. Fig. 1 shows a cutting tool 60 carried by a shoe 61 which is held against the outside of the tube 16' above a supporting roll 62 at sufficient distance beyond the welding rolls so that the metal is cool enough to cut by the time it reaches the tool 60.

Inside flash is removed by a cutting tool 64 carried by a holder 65 at the end of a mandrel 66. The mandrel is held at its forward end by a support 68 fastened to the frame of the machine. The inside cutting tool 64 operates on the tube while it is traveling through a roll stand 70 which is similar in construction to the welding roll stand 42 but has smooth-face rolls such as shown in Fig. 4. When the tube is made with no flash, the cutting tools and mandrel are unnecessary. It is for this reason that no mandrel is shown in Fig. 4.

There are worm wheels 20, 72 and 73 secured to the axles of the lower rolls of the roll stands 12, 42 and 70, respectively. These worm wheels are driven by worms 74, 75 and 76 on a common shaft 77. The shaft is driven from a motor 79 through reduction gearing 80. The speed of the motor can be varied by a speed control device 82. This apparatus for applying power to the rolls is mostly diagrammatic in Fig. 1 and is merely representative of means for driving the rolls at the desired speed.

Figs. 5 and 6 show the construction of the torch 39. The bottom face of the torch has transverse ribs 85 with recesses 86 along the center portions of the ribs. The walls of the recesses 86 slope at an angle of 45° and therefore include a right angle between them, as illustrated in Figs. 7 and 8. A jet orifice 88 is drilled through the right-hand wall of alternate recesses 86, and a jet orifice 89 is drilled through the left-hand wall of the intervening recesses.

A flame jet 91 from each of the jet orifices 88 is projected against the left-hand edge face of the open seam as shown in Fig. 7, while a flame jet 92 from each of the jet orifices 89 is projected against the right-hand edge face, as shown in Fig. 8.

Toward the rearward portion of the torch, which is above that part of the tube where the edges are moving together under the influence of the welding rolls 44, 45 there are jet orifices in both walls of each recess. The flame jets from these orifices are projected angularly against one another so that they meet in a thin elongated resultant flame 94 (Fig. 9) which is projected downward into the seam cleft, the flame being like that produced by a fish-tail burner.

Near the rearward end of the torch there are jet orifices 95 which not only direct their flame jets diagonally against one another to produce a wide, flat flame like that of a fish-tail burner, but direct the flame jets rearwardly at decreasing angles to the horizontal so that flames are projected into the seam cleft up to substantially the point where the edge faces come into contact with one another.

The torch has a chamber 97 for cooling fluid which flows to and from the torch through conduits 98 and 99. Gas for the flame jets is supplied from gas chambers 101 and 102, the gas being supplied to these chambers through pipes 103 and 104, respectively. The gas chamber 101 comprises a long groove milled in the side of the torch body and covered by a plate 106 which is countersunk into the torch body and silver-soldered to make a gas-tight chamber. The other gas chamber 102 is of similar construction. The torch has brackets 108 by which it is held in position, the brackets being slotted to permit a limited vertical adjustment of the torch.

In carrying out the method of this invention, the tube blank 16, which may be either cold or preheated, is propelled by the feed rolls 14 and 15 into the passes between the gathering rolls and then through the welding roll stand 42. The speed at which the tube blank moves through the machine and under the torch is adjusted by means of the speed control device 82. The gathering rolls are adjusted to obtain the desired spacing between the seam edges which will permit each flame jet to be projected directly against the edge face opposite the orifice from which that jet issues without overheating or melting away the upper corner of the other edge.

With a given adjustment of the space between the edge faces, the speed of travel of the tube blank is so proportioned to the length and intensity of the heating means that the metal back of the edges absorbs sufficient heat to maintain the edge faces in a welding condition until they come in contact and to prevent cooling of the weld at a rate which substantially changes the hardness of the metal.

No formula for this relation can be given because there are many factors to be considered including the thickness of the material, the kind of steel, the critical temperature of the steel, and amount of preheating, if any.

In using this invention in practice to weld certain hard rolled stock with no preheating, a speed of 27 ft. per minute was found to cause an increase in hardness at the weld of 20–25 points, but at 18 ft. per minute and the same heating agency the increase in hardness was only 4 or 5 points. While 4 or 5 points is not a substantial increase, the change in hardness could be still further reduced by dropping the speed to approximately 16 ft. per minute. At still slower speed the heat conducted into the metal back of the edge portions would be sufficient to produce an annealing of the metal so that the change in hardness as a result of the welding operation would be down instead of up.

The theoretical optimum at which there is absolutely no change in hardness either way is seldom, if ever, attained in practice, and it is unnecessary that it should be. The optimum can be approached nearly enough to prevent any substantial change in hardness.

I claim:

1. The method of making welded pipes and tubes by locally heating the spaced longitudinal edges of a traveling tube blank and progressively bringing the edges into contact immediately beyond the region of heating, and effecting the heating by projecting flame jets diagonally and directly against the spaced faces of the edges during most of the heating step, and projecting flame jets diagonally against each other in position to deflect a flat flame of high intensity into the space between said edges during the latter part of the heating step and while the edge faces are moving into contact.

2. The method of welding the longitudinal seam of a tube blank comprising locally heating the edge portions of a tube blank by applying heating agencies directly against the edge faces which are to be welded, moving the tube blank progressively past the heating agencies and bringing the edge faces together beyond said heating agencies, and projecting flame jets angularly against one another above the seam in such manner that a thin elongated resultant flame is projected into the seam and between the heated edge faces as they travel between the region of direct heating by said agencies and the point at which said edge faces are brought into contact to make the weld.

JAMES L. ANDERSON.